Sept. 22, 1936.　　　G. H. GIBSON　　　2,054,798
WATER PURIFICATION
Filed July 30, 1932
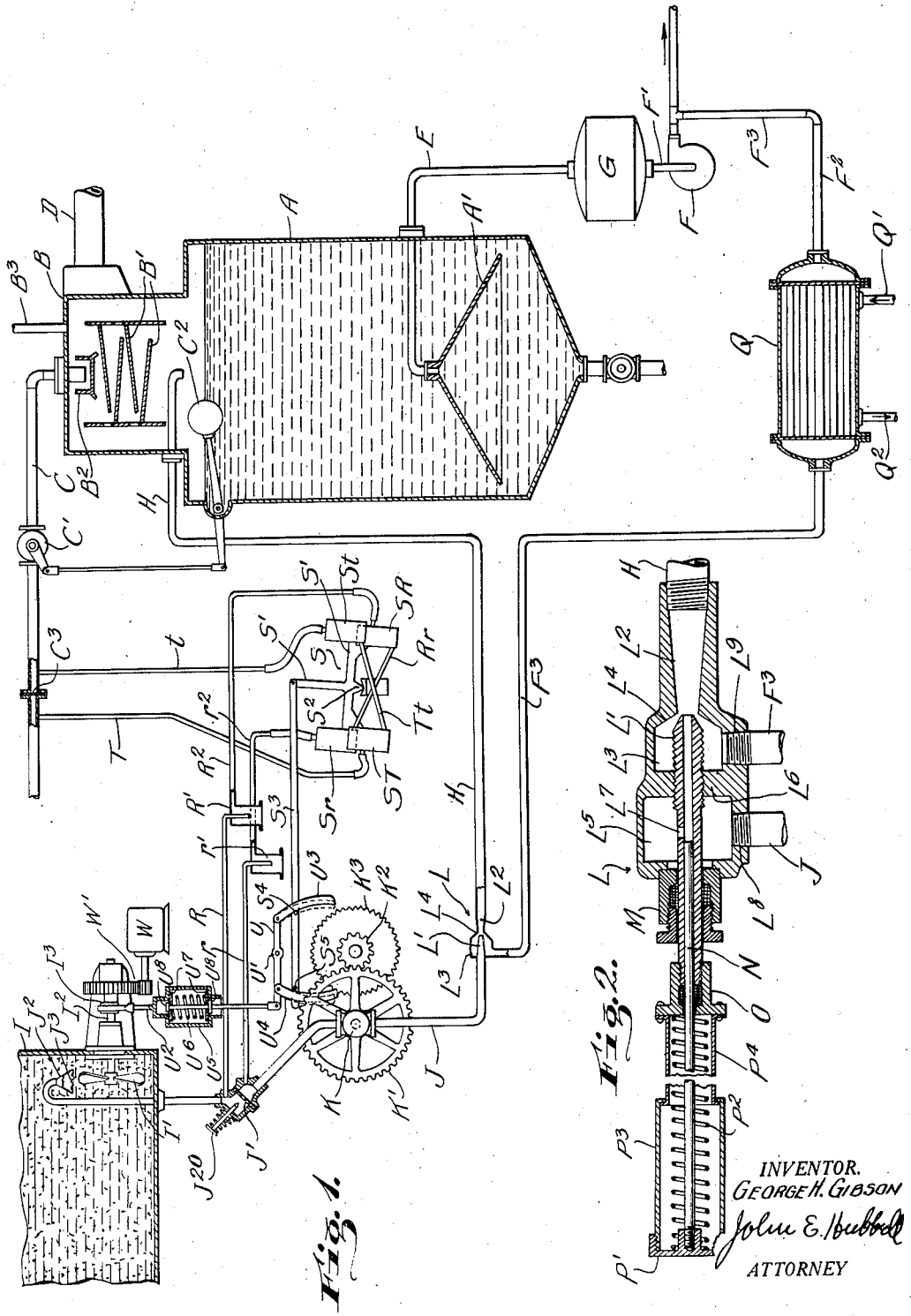

Patented Sept. 22, 1936

2,054,798

UNITED STATES PATENT OFFICE 2,054,798

WATER PURIFICATION

George H. Gibson, Upper Montclair, N. J.

Application July 30, 1932, Serial No. 626,340

15 Claims. (Cl. 210—14)

The present invention has for its general object improvements in method and apparatus for feeding a chemical purifying agent into admixture with the water to be purified in water purification systems and particularly in water purification systems, such as the well known hot process water softening systems in general use for the treatment of boiler feed water, wherein the nature of the reagent makes its supply at the rate and in the relatively small amounts required, a serious problem.

In water softening systems the reagent ordinarily employed consists of calcium hydrate alone, or more usually in admixture with soda ash. In general, also, the chemical reagent is drawn as used from a supply receptacle or tank containing calcium hydrate or calcium hydrate and soda ash in solution and also containing undissolved calcium hydrate in a finely divided solid form which must be held in suspension by the solution as it is fed from the supply receptacle. The experience of the art has shown that it is practically essential to draw the reagent from a receptacle in such concentrated form that the portion of the lime hydrate held in suspension is so large in amount that its tendency to settle out of the liquid in which it is held, with resultant weakening of the reagent drawn from the receptacle, can be prevented only by continuous and vigorous agitation of the contents of the supply receptacle while the reagent used is being withdrawn therefrom.

While the reagent withdrawn from the supply receptacle may be diluted with water and its fluidity thereby increased during the passage of the reagent from the supply receptacle into admixture with the water to be purified, it is practically essential to mix the diluent with the reagent only after the passage of the latter through an initial portion of the reagent feed line leading away from the supply receptacle in which the rate of flow of the reagent is measured, so that the rate of reagent supply may be proportioned to the rate at which water is supplied for purification.

The problem of moving the reagent from the supply receptacle at the proper rate is augmented by the fact that in ordinary practical apparatus the rate of reagent feed is so small that the reagent feed stream must be relatively minute to insure a sufficiently high reagent stream velocity at all times to prevent the solid calcium hydrate from settling out and depositing in the reagent flow passage or passages. The latter must thus be relatively small in cross section and hence are easily stopped or choked by the solid material settling out of the solution, and this difficulty is aggravated by the tendency of the deposited calcium hydrate to cake on exposure to air or on contact with a diluent such as raw water containing impurities reacting chemically with calcium hydrate.

The above mentioned conditions have led the practical art in the past to make use of relatively complicated, bulky and expensive apparatus for adding the reagent to the water to be purified. In the most widely used and successful practical apparatus for hot process water softening, two mechanical pumps are used in the reagent feed line, and notwithstanding the relatively small amount of reagent handled, the installation, maintenance and operation costs of the reagent handling apparatus constitute a very considerable portion of the installation, maintenance and operating costs of the complete system.

In accordance with the present invention I avoid the necessity for any separate mechanical pump for moving the chemical reagent from the supply receptacle to the reaction chamber of a boiler feed water purifying system, by the use of a jet ejector giving motion to the reagent and supplied with impelling fluid conveniently and preferably by a connection to the boiler feed line at the delivery side of the ordinary boiler feed pump of the system. Such a boiler feed pump is required in any event in such a system, and ordinarily is a relatively large and efficient pump, and with such a pump the additional duty of giving movement to the relatively small amount of impelling liquid required for the use of the present invention, adds nothing significant to the required capacity and cost of operation of the pump.

I am aware that the use of an ejector in lieu of a mechanical pump for feeding chemical reagent in a water purification system has been previously proposed, but so far as I am aware, no such proposal previously made has been found successful or has gone into commercial use. While I preferably employ an ejector differing in some features of construction and arrangement from ordinary ejectors, I avoid major difficulties which have heretofore prevented the use of an ejector for this purpose by the method which I have devised for making use of the ejector. My method departs from ordinary ejector practice in passing the impelling fluid into that ejector chamber which in ordinary ejector practice serves as the mixing or suction chamber to which the impelled fluid is admitted, and by passing the reagent into the ejector through the supply nozzle in alignment with the ejector discharge nozzle and through which the impelling fluid is passed into the ejector in ordinary ejector practice.

With my improved method of operation the reagent issues from the discharge end of the supply nozzle in a pencil like stream or jet which is axially received in and enveloped by the impelling stream of water which holds the reagent out of contact with the wall of the ejector discharge nozzle and out of the throat or annular nozzle through which the impelling fluid passes from the ejector chamber in which it is initially received into the discharge nozzle. In consequence, there is no possibility of deposit from the reagent on the walls of the discharge nozzle or of said throat. Moreover, since the bore of the supply nozzle may be in the form of a small straight passage with a smooth wall, the tendency of the reagent to deposit on that wall is relatively slight. Furthermore, the ejector may readily, and preferably is provided with means by which the passage through the supply nozzle may be easily and effectively cleaned from time to time, as occasion requires. The invention thus possesses the advantage of easy maintenance of the proper dimensions and proportions of the various nozzle passages required for continuous and effective ejector action.

In the preferred mode of practicing the invention the entraining action of the impelling fluid puts a suction on the ejector supply nozzle adequate to move the reagent from the supply receptacle to the ejector through a pipe of such relatively small diameter that the velocity of the reagent stream may be readily measured by a simple measuring orifice in said pipe in such manner that the measurement may be used in connection with the measurement of the flow of water to be purified, to actuate suitable control provisions for a valve or other means variably throttling or otherwise regulating the flow through the reagent feed line.

Preferably the above mentioned flow measuring means regulates the rate of reagent supply through its control action on a valve actuating relay mechanism which may be operated hydraulically, electrically or in any other usual or suitable manner, and which is preferably a mechanical relay mechanism motivated by the motor or other power means employed to operate the agitator in the reagent supply receptacle or tank.

The various features of novelty which characterize my invention are pointed out with particularity in the claims annexed to and forming a part of this specification. For a better understanding of the invention, however, and the advantages possessed by it, reference should be had to the accompanying drawing and descriptive matter in which I have illustrated and described a preferred embodiment of the invention.

Of the drawing:

Fig. 1 is a diagrammatical elevation of a so-called hot process boiler feed water softener; and Fig. 2 is a sectional elevation of the ejector employed in Fig. 1.

In the drawing, and referring first to the form of the invention illustrated in Figs. 1 and 2, A represents a reaction tank, the lower portion of which serves as a sedimentation chamber and which receives heated water to be purified from a heater B mounted on top of the reaction tank and in open communication therewith. The heater B is essentially an open feed water heater receiving at its upper end the water to be heated from a water supply pipe C. The rate at which water to be purified is supplied by the pipe C is regulated by a valve C' which is adjusted by a float C² in the chamber A as required to maintain the water level in the chamber A approximately at the level shown. The heater B contains water spraying baffles or trays B', onto which the water coming from the supply pipe C is discharged through a distributing box B², and over which the water flows in film-like and broken streams while in contact with steam supplied to the heater through a steam inlet D, the steam supplied ordinarily being exhaust steam. The air and gases liberated from the water in the heating and purification of the latter, escape from the heater A through a vent pipe B³.

Water is withdrawn from the reaction tank A through a conical member of inverted funnel A' and the discharge pipe E connected to the apex of the chamber A'. The pipe E is connected to the inlet of the delivery pump F, which ordinarily is a boiler feed pump. Ordinarily a filter chamber G is interposed as shown between the pipe E and the inlet F".

The chemical purifying reagent is supplied to the lower end of the heater B through a pipe H so that it comes into contact with water to be purified as the latter passes from the trays in the heater B to the reaction chamber A. The pipe H receives the reagent from a chemical supply tank I, and means are provided for proportioning the reagent flow through the delivery pipe J from the tank I, to the flow of water through the conduit C. In respect to all of the features specifically mentioned above, the apparatus shown in Fig. 1 contains nothing now novel with me, but, on the contrary, is a typical instance of an existing type and form of apparatus for heating and softening boiler feed water with which my invention, now to be described, may be used with advantage.

The apparatus shown in Fig. 1 differs from apparatus heretofore used, however, in respect to the character of the means for causing the reagent to flow through the pipes J and H into the reaction chamber A, and in the character of the means employed for proportioning that flow to the flow of water through the water supply pipe C. In accordance with the present invention the reagent is drawn through the pipe J and forced through the pipe H by a jet ejector L comprising a supply nozzle L' which is in axial alignment with an expanding delivery nozzle L² and which extends part way through a chamber L³. The latter communicates with the inlet end of the nozzle L² through the annular throat or passage L⁴ between a surrounding conical wall portion of the chamber L³ and an inner conical surface formed by the tapered discharge end of the nozzle L'. The conical angle of said surface is smaller than that of said wall portion so that the transverse cross sectional area of the throat L⁴ diminishes in the direction of flow from the chamber L³ into the nozzle L².

While in respect to the above mentioned features above referred to, the ejector L does not differ from the most usual form of ejectors, its intended operation departs from ordinary ejector practice in that the chamber L³ is a pressure chamber receiving the impelling fluid, which, as shown, is water supplied through the pipe F² from the chamber A, while the impelled fluid is the chemical reagent sucked through the nozzle L' and pipe J by the entraining action of the impelling liquid flow through the throat L⁴ into the nozzle L². With such operation, the reagent jet or stream discharged from the nozzle L' is surrounded and axially received in an enveloping annular stream of impelling water forming a diluent for the reagent. This method of moving the reagent by a jet ejector action, avoids the difficulties which have been found practically prohibitive to the success of attempts to move the reagent by supplying it to an ejector chamber corresponding to the chamber L³ while discharging the impelling fluid through a nozzle corresponding to the nozzle L' in accordance with the customary method of operating ejectors.

The difficulty referred to arises, as has already been indicated, from the character of the reagent employed. With the described method of operation the bore of the nozzle L' forms a suitably small and smooth walled flow passage for the reagent which can be readily cleaned from time to time, and as water is the only fluid flowing through the throat L⁴, and is in contact with, and holds the reagent out of contact with, the wall of the discharge nozzle L², there is practically no opportunity for solid deposits from the reagent to clog or restrict any of the ejector flow passages which must be kept clean to insure the injector proportions required for proper ejection action.

Advantageously provisions are made as shown in Fig. 2 for cleaning out the bore of the nozzle L' whenever such cleaning is desirable. Fig. 2 shows a suitable structural form of the ejector diagrammatically illustrated in Fig. 1, comprising an ejector body member in which the chamber L³ and delivery passage L² are formed and in which there is formed a chamber L⁵ separated from the chamber L² by a partition L⁶. The nozzle member L' passes through an aperture in partition L⁶ and extends rearwardly therefrom through the chamber L⁴ and projects away from the adjacent end of the ejector body. A stuffing box M surrounding the nozzle member L closes the opening in the wall of the chamber L⁵ through which the nozzle member projects. As shown, the aperture in the partition L⁶ is internally threaded and a portion of the nozzle member L' is externally threaded to permit of a screw adjustment of the nozzle member for varying the cross section of the throat L⁴, though with the parts properly proportioned initially, such adjustment is not essential. An internally threaded inlet L⁸ into the chamber L⁵ receives the discharge end of the delivery pipe J from the reagent tank. The reagent passes from the chamber L⁵ into the bore of the nozzle member L' through an opening or openings L⁷ in the wall of the latter. The impelling fluid supply pipe F³ is threaded into the inlet L⁹ of the chamber L².

Axially fitted in the bore of the nozzle L' is a plunger N which normally has its inner end at the lefthand side of the opening L⁷ as seen in Fig. 2, but which may be advanced to the righthand end of the nozzle whenever it becomes desirable to clean out the bore of the latter. The plunger N projects from the lefthand end of the nozzle L', and the latter is provided with a stuffing box O for preventing leakage outward along the plunger. The latter is conveniently given its cleaning movements and normally held in its retracted position by means of a push button or cap member P', to which the outer end of the plunger N is secured, and a compression spring P² acting between the member P' and the stuffing box O. As shown the spring P² is encased, and the outward movement of the plunger is limited by a casing comprising a tubular casing section P³ secured at its outer end to the member P', and telescoping with a tubular casing section P⁴ secured at its righthand end to the stuffing box O. The casing sections P³ and P⁴ are provided at their normally adjacent ends with flanges inturned and outturned, respectively, which engage to limit the outward movement of the plunger N under the action of the spring P².

The impelling fluid supply pipe F³ is advantageously a branch from the boiler feed line F² which is connected to the outlet of the boiler feed pump F. The boiler feed line is a convenient source of impelling liquid supply under suitable pressure, and possesses the special advantage that the boiler feed water is already purified and hence will not react with the chemical reagent in the jet ejector L or pipe H. As the boiler feed water is heated, however, it is not suitable for use without cooling as ejector impelling liquid. In accordance with the present invention I cool the water passing through the pipe F³ by passing it through a heat exchanger Q, which may well be of the surface type and is shown as provided with an inlet Q' and outlet Q² through which cooling water from some suitable source is passed. The cooling water in the heat exchanger Q may be a portion of the raw water eventually passed to the reaction chamber through the pipe C. However, the comparatively small volume of impelling liquid and consequently small volume of heat exchanger cooling liquid required makes the source of supply of the latter relatively unimportant.

With the arrangement described the pipe F³ including the heat exchanger Q, the ejector L and the pipe H form a by-pass through which water normally passes from the bottom of the reaction chamber A back to the upper portion of that chamber or, more accurately in the arrangement shown, to the lower portion of the heater B. The water supplied to the ejector L by the initial portion of this by-pass envelops, entrains and dilutes the chemical reagent, the diluted mixture being delivered to the heater B and thereby to the top of the reaction chamber through the final portion of the by-pass.

The pipe J through which the chemical reagent passes from the tank I to the ejector L includes a measuring orifice J'. As diagrammatically shown, the portion of the pipe J including the orifice J' is bent to permit a normally spring retracted plunger J²⁰ to be manually advanced from time to time to penetrate and clean the orifice. The difference between the pressures at the inlet and outlet side of the orifice J' constitutes a measure of the rate of reagent flow through the conduit J and is utilized in maintaining that flow in proportion to the rate of water supply through the conduit C. To this end in the construction diagrammatically illustrated, the pressures at the high and low sides of the orifices are transmitted through high and low pressure conduits to high and low pressure chambers SR and Sr, respectively, of a flow measuring balance S comprising a balance lever S' pivoted at S² and carrying the chambers SR and Sr. The high pressure conduit comprises sections R and R² connected by a closed settling chamber R', the section R leading away from the conduit J and extending downward into the settling chamber R' from the top of which the section R² runs to the chamber SR. The lower pressure conduit comprises similar sections r and r² and a settling chamber r', the section r² being connected to the chamber Sr. The settling chambers R' and r' are provided to receive solid reagent constituents which may settle out of the liquid in the conduit sections R and r. The conduit sections R² and r², or at least the portions thereof adjacent the balance S, must be sufficiently flexible to offer no significant resistance to tilting movement of the balance lever S' on changes in the pressure chambers thereof and consequent movement of sealing liquid, ordinarily mercury, from one chamber into the other.

As shown the conduit Rr connects the lower portions of the chambers SR and Sr and permits sealing liquid flow between the chambers.

The balance lever S' also carries two other pressure chambers ST and St which have their lower ends connected by a sealing liquid flow passage Tt. The chamber ST is connected by a conduit T to the conduit C at the inlet side of a measuring orifice $C^3$ in the last mentioned conduit. A conduit t transmits the pressure at the low pressure side of the orifice $C^3$ to the chamber St. The conduits T and t, or at least the lower portions thereof, must be sufficiently flexible not to significantly oppose the tilting movements of the supporting lever of the balance S. As shown the chambers SR and St are located at one side and the chambers ST and Sr are located at the other side of the balance pivot axis $S^2$. In consequence, on an increase of flow through the conduit C, the resultant displacement of sealing liquid from the chamber ST into the chamber St tends to tilt the balance in the clockwise direction, unless a corresponding increase in flow through the conduit J results in a corresponding displacement of sealing liquid from the chamber SR into the chamber Sr. On a decrease in flow in the conduit C relative to the flow in the conduit J, the balance lever tilts in the counter-clockwise direction as a result of the then occurring sealing liquid displacement.

The tilting movements of the balance produced by an increase or decrease in the flow through the conduit J relative to the flow through the conduit C is employed to adjust the valve K as required to increase or decrease the throttling effect of that valve and thus restore the normal proportion between the flows in the two conduits. The variable throttling adjustments of the valve K require more power than can be conveniently supplied by the balance S, and the latter effects the valve adjustments in accordance with the present invention by controlling the operation of a relay mechanism. The latter as shown comprises a lever U pivoted at U' and oscillated by a connecting rod $U^2$ pivoted at its lower end to the lever U, and carrying an eccentric strap at its upper end which surrounds an eccentric $I^3$ carried by a constantly rotating shaft $I^2$. The latter is the agitator shaft for the reagent supply tank I, extending through the wall of the latter and carrying at its inner end propeller or agitator blades I' in proximity to which the downturned inlet end $J^2$ of the pipe J is preferably located. As shown the shaft $I^2$ is continuously rotated at a suitable speed by a motor W having its shaft connected by a reduction gear W' to the agitator shaft $I^2$. Advantageously, and as shown the inlet end $J^2$ of the pipe J is enlarged and provided with a screen $J^3$ to thereby prevent large solid bodies from entering and clogging the pipe J.

The lever U pivotally supports depending pawls $U^3$ and $U^4$, arranged one at one side, and the other at the opposite side of the pivot U'. The pawls $U^3$ and $U^4$ under certain conditions coact with and give movements in opposite directions to a ratchet wheel $K^3$ which is gear connected to the spindle of the valve K. As shown the gear connection comprises a large gear K' secured to the spindle of the valve K and in mesh with a small gear $K^2$ co-axial with, and secured to the ratchet wheel $K^3$. With the flows through the conduits C and J in proper proportion and the balance lever S' in its neutral position, both pawls $U^3$ and $U^4$ are held out of engagement with the teeth of the ratchet wheel $K^3$ by pins or projections $S^4$ and $S^5$, respectively, which are carried by a bar $S^3$ pivotally connected to the lever S' and horizontally reciprocated when the lever tilts first in one direction and then in the other.

When the balance lever S' tilts in the clockwise direction, the resultant movement of the projection $S^5$ to the right permits the pawl $U^4$ to engage a tooth of the ratchet $K^3$ and give the latter a counter-clockwise adjustment on the descending stroke of the connecting rod $U^2$. The counter-clockwise movement of the lever S' results from an increase of flow through the conduit C relative to that through conduit J, and the resultant adjustment of the valve K is an opening adjustment increasing the flow through the conduit J and returning, or tending to return, the balance lever S to its neutral position. Conversely when the balance lever tilts in the clockwise direction on a decrease in flow through the conduit C relative to that in the conduit J, the movement to the left of the projection $S^4$ permits the pawl $U^3$ to engage a tooth of the ratchet wheel $K^3$ and impart clockwise movement to the latter on the ascending stroke of the connecting rod $U^2$, with a corresponding closing adjustment of the valve K again restoring or tending to restore the desired ratio of flow. If any one movement imparted to the wheel $K^3$ is too small to restore the balance of flow, the next stroke in the corresponding direction of the connecting rod $U^2$ will produce a further movement of the wheel $K^3$ and corresponding adjustment of the valve K. It will be observed that with the arrangement shown, the extent of movement imparted by either pawl to the wheel $K^3$ on the corresponding stroke of the connecting rod $U^2$ will be greater or less in extent, according to the extent of deflection of the balance lever S' from its neutral, since with a greater deflection S' the corresponding pawl will engage the ratchet wheel $K^3$ earlier in the corresponding stroke of the rod $U^2$ than when the deflection S' is smaller.

As shown, the connecting rod $U^2$ comprises separate end portions and a yielding connection between them. The latter, as shown, comprises a sleeve $U^5$ attached to the upper rod portion, a tension spring $U^6$, and upper and lower washers $U^7$ surrounding the lower end portion of the rod $U^2$. The tension of the spring $U^6$ normally holds the washers $U^7$ against upper and lower collars $U^8$ on said lower end portion and against the respective upper and lower end walls of the sleeve $U^5$, so that during normal operation the sections are held in the relative positions shown. The spring $U^6$ yields, however, to permit the connecting rod $U^2$ either to shorten or to elongate when necessary to avoid injury to the valve K and its operating mechanism under conditions in which the relay mechanism may tend to open or close the valve K after the latter has reached the limit of its movement in the opening or closing direction, respectively.

The complete operation of the apparatus disclosed will be apparent, it is believed, without further explanation. As those skilled in the art will understand, the adjustment of the valve K by power actuated means under the control of the flow balance permits the latter to be sufficiently sensitive in its action to suitably respond to a small pressure differential at the opposite sides of the measuring orifice J' without requiring that orifice to be especially small in diameter relative to the diameter of the pipe J. In consequence of small flow resistance of the orifice J' required it becomes readily possible to insure an adequate movement of reagent through the pipe J under the suction action of the ejector L of desirably small size and supplied with a desirably small amount of impelling liquid.

A special advantage of the use of an injector to move the reagent is that the impelling force of the latter is adequate even though the reagent supply receptacle be located at a level appreciably below that of the point at which the reagent is discharged into admixture with the water to be purified, as spatial conditions may make necessary or desirable in some cases.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention what I claim as new and desire to secure by Letters Patent, is:

1. In water purifying apparatus, the combination with a conduit supplying water to be purified, a measuring element in said conduit, a reagent supply receptacle, a conduit leading from said receptacle, an ejector drawing reagent from said receptacle through the last mentioned conduit and delivering it into admixture with the water to be purified, a measuring element included in the last mentioned conduit, and means jointly controlled by said measuring elements for proportioning the flow in the last mentioned conduit to the flow through the first mentioned conduit.

2. In a fluid proportioning apparatus, the combination with a conduit supplying one fluid, a measuring element in said conduit, a receptacle containing a second fluid, a conduit leading from said receptacle, an ejector drawing fluid from said receptacle through the last mentioned conduit and delivering it into admixture with the first fluid, a measuring element included in the last mentioned conduit, and means jointly controlled by said measuring elements for proportioning the flow in the last mentioned conduit to the flow through the first mentioned conduit.

3. In water purifying apparatus comprising a reaction chamber, means supplying water to be purified to said chamber at a variable rate, a reagent supply receptacle, means for passing reagent from said receptacle to said chamber comprising a conduit leading away from said receptacle, a valve regulating flow through said pipe, a power actuated relay mechanism for adjusting said valve, and controlling means for said mechanism jointly responsive to the rate of flow through said conduit and to the rate at which water is supplied to said chamber by the first mentioned means.

4. In water purifying apparatus comprising a reaction chamber, means supplying water to be purified to said chamber at a variable rate, a reagent supply receptacle, means for passing the reagent from said receptacle to said chamber comprising an ejector, a pipe leading away from said receptacle and connecting the latter to the suction inlet of said ejector and comprising a measuring orifice, and means supplying said ejector with impelling fluid drawn from the reaction chamber and for returning said impelling fluid and the reagent drawn into the ejector from said pipe by the impelling fluid to the reaction chamber, a regulating valve in said pipe, a power actuated relay mechanism adjusting said valve, and controlling means for said mechanism jointly responsive to the pressure drop through said measuring orifice and to a measure of the rate at which water is supplied to the reaction chamber.

5. The combination in a water purifying system of a reaction chamber, means for supplying water to be purified to the upper portion of said chamber, and a by-pass connecting the lower and upper portions of said chamber and comprising a pump and an ejector connected in the order stated between initial and final portions of said by-pass, said ejector comprising a pressure chamber receiving water through said pump and from said initial by-pass portion, a discharge nozzle opening from said pressure chamber into said final by-pass portion, and a reagent supply nozzle in alignment with said discharge nozzle and having its discharge end terminating in said pressure chamber adjacent but spaced away from the adjacent end of said discharge nozzle whereby the impelling liquid passing from said chamber to said discharge nozzle exerts a suction effect on the discharge end of said supply nozzle.

6. The combination in a water purifying system, of a reaction chamber, means for supplying water to be purified to the upper portion of said chamber, a by-pass connecting the lower and upper portions of said chamber and comprising a pump and an ejector connected in the order stated between initial and final portions of said by-pass, said ejector comprising a pressure chamber receiving water through said pump from said initial by-pass portion, a discharge nozzle opening from said pressure chamber into said final by-pass portion, and a reagent supply nozzle in alignment with said discharge nozzle and having its discharge end terminating in said pressure chamber adjacent but spaced away from the adjacent end of said discharge nozzle whereby the impelling liquid passing from said chamber to said discharge nozzle exerts a suction effect on the discharge end of said supply nozzle, and means for removing deposited material from the bore of said supply nozzle.

7. The combination in a water purifying system, of a reaction chamber, means for supplying water to be purified to the upper portion of said chamber, a by-pass connecting the lower and upper portions of said chamber and comprising a pump and an ejector connected in the order stated between initial and final portions of said by-pass, said ejector comprising a pressure chamber receiving water through said pump and from said initial by-pass portion, a discharge nozzle opening from said pressure chamber into said final by-pass portion, and a reagent supply nozzle in alignment with said discharge nozzle and having its discharge end terminating in said pressure chamber adjacent but spaced away from the adjacent end of said discharge nozzle whereby the impelling liquid passing from said chamber to said discharge nozzle exerts a suction effect on the discharge end of said supply nozzle, and means for passing said reagent to said supply nozzle at a regulated rate in proportion to the rate at which water is supplied to the upper portion of the first mentioned chamber by the first mentioned means.

8. The combination in a hot process water purifying system, of a reaction chamber, means for supplying heated water to be purified to the upper portion of said chamber, and a by-pass connecting the lower and upper portions of said chamber and comprising a water cooling means and a pump and an ejector connected between initial and final portions of said by-pass, said ejector comprising a pressure chamber receiving water through said cooler and pump from the initial portion of said by-pass, a discharge nozzle opening from said pressure chamber into said final by-pass portion and a reagent supply nozzle in alignment with said discharge nozzle and having its discharge end terminating in said pressure chamber adjacent but spaced away from the adjacent end of said discharge nozzle, whereby the impelling liquid passing from said chamber to said discharge nozzle exerts a suction effect on the discharge end of said supply nozzle.

9. The combination in a water purifying system, of a reaction chamber, a reagent supply receptacle and a delivery pipe therefrom, means for supplying water to be purified to the upper portion of said chamber, a by-pass connecting the lower and upper portions of said chamber and comprising a pump and an ejector connected in the order stated between initial and final portions of said by-pass, said ejector comprising a pressure chamber receiving water through said pump from the initial portion of said by-pass, a discharge nozzle opening from said pressure chamber into said final by-pass portion and a reagent supply nozzle connected to the delivery end of said pipe and in alignment with said discharge nozzle and having its discharge end terminating in said pressure chamber adjacent but spaced away from the adjacent end of said discharge nozzle whereby the impelling liquid passing from said chamber to said discharge nozzle exerts a suction effect on the discharge end of said supply nozzle and thereby on said pipe, and means for variably throttling the flow through said pipe.

10. The combination in a water purifying system, of a reaction chamber, a reagent supply receptacle and a delivery pipe therefrom, means for supplying water to be purified to the upper portion of said chamber, a by-pass connecting the lower and upper portions of said chamber and comprising a pump and an ejector connected in the order stated between initial and final portions of said by-pass, said ejector comprising a pressure chamber receiving water through said pump from the initial portion of said by-pass, a discharge nozzle opening from said pressure chamber into said final by-pass portion, and a reagent supply nozzle connected to the delivery end of said pipe and in alignment with said discharge nozzle and having its discharge end terminating in said pressure chamber adjacent but spaced away from the adjacent end of said discharge nozzle whereby the impelling liquid passing from said chamber to said discharge nozzle exerts a suction effect on the discharge end of said supply nozzle and thereby on said pipe and means for throttling the flow through said pipe to thereby supply reagent to said supply nozzle at a rate at which water is supplied to the upper portion of the first mentioned chamber by the first mentioned means.

11. In water purifying apparatus comprising a reaction chamber, a conduit supplying water to be purified at a variable rate to said chamber, a reagent supply receptacle, an agitator in said receptacle, a motor driving said agitator, means for passing the reagent from said receptacle to said chamber comprising a pipe leading away from said receptacle, means exerting a suction on said pipe, a valve regulating flow through said pipe, a mechanical relay mechanism actuated by said motor for adjusting said valve and controlling means for said mechanism comprising means jointly responsive to the respective flows through said conduit and pipe for maintaining said flows in proportion.

12. In water purifying apparatus comprising a reaction chamber, a conduit supplying water to be purified at a variable rate to said chamber, a reagent supply receptacle, an agitator in said receptacle, a motor driving said agitator, means for passing the reagent from said receptacle to said chamber comprising a pipe leading away from said receptacle, a valve regulating flow through said pipe, mechanical relay mechanism actuated by said motor for adjusting said valve, and controlling means for said mechanism comprising means jointly responsive to the respective flows through said conduit and pipe for maintaining said flows in proportion.

13. In water purifying apparatus, the combination with a conduit supplying water to be purified, a measuring element in said conduit, diluent liquid supply means, a reagent supply receptacle, a conduit leading from said receptacle, an ejector receiving reagent from the last mentioned conduit and receiving diluent liquid from said means and discharging into admixture with the water to be purified, a measuring element included in the last mentioned conduit, and means jointly controlled by said measuring elements for proportioning the flow in the last mentioned conduit to the flow through the first mentioned conduit.

14. In water purifying apparatus, the combination with a conduit supplying water to be purified, a measuring element in said conduit, an ejector having an impelling fluid chamber, an outlet for the passage of a stream of liquid from said chamber into admixture with the water to be purified and a nozzle opening axially of said stream into said outlet, a reagent supply receptacle, a conduit leading from said receptacle to said nozzle, means supplying impelling fluid to said chamber, a measuring element included in the last mentioned conduit, and means jointly controlled by said measuring elements for proportioning the flow in the last mentioned conduit to the flow through the first mentioned conduit.

15. In the operation of a hot process water purifying system, the method of passing a chemical reagent into the reaction chamber of the system from a reagent supply receptacle which consists in passing the water to be purified into the chamber in a stream and thereby creating a pressure differential which is a measure of the rate at which the water is supplied, withdrawing a stream of purified water from said chamber to thereby create a suction effect, drawing a stream of reagent from said receptacle by said suction effect and thereby creating a pressure differential which is a measure of the rate of reagent withdrawal and admixing the reagent with the stream of purified water, passing the mixture into the reaction chamber, and regulating the rate of reagent withdrawal by and in accordance with the joint effect of the two pressure differentials.

GEORGE H. GIBSON.